Feb. 19, 1946.     S. R. NAYSMITH     2,395,008
FLUORESCENT LIGHTING EQUIPMENT
Filed March 16, 1943     3 Sheets-Sheet 1
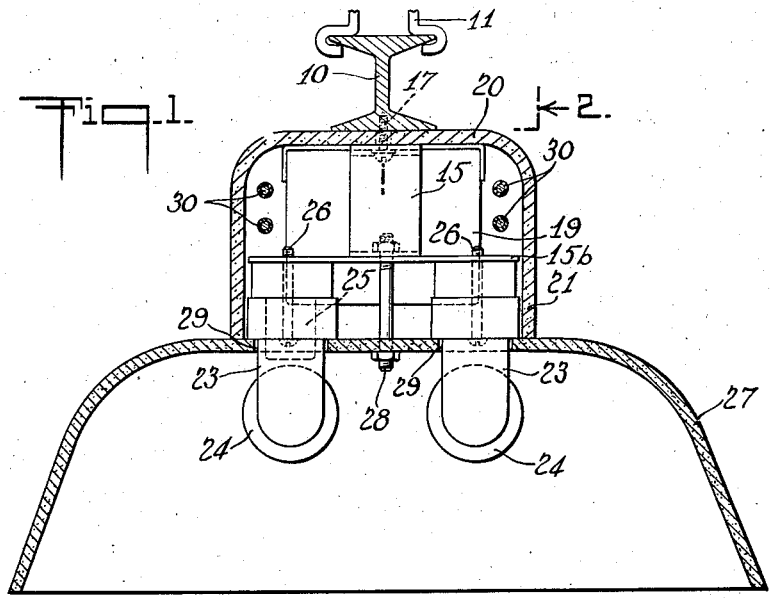
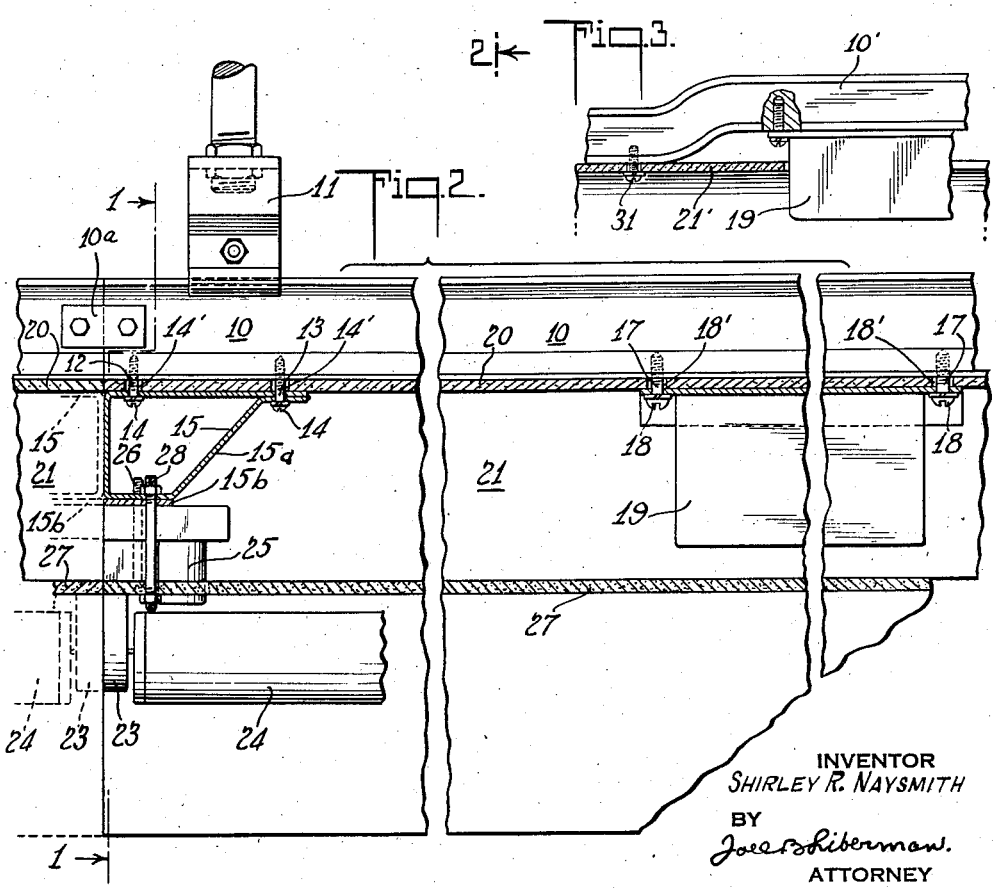
INVENTOR
SHIRLEY R. NAYSMITH
BY
Joel S. Liberman
ATTORNEY Feb. 19, 1946. S. R. NAYSMITH 2,395,008
FLUORESCENT LIGHTING EQUIPMENT
Filed March 16, 1943 3 Sheets-Sheet 2
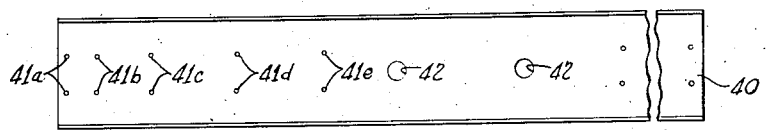
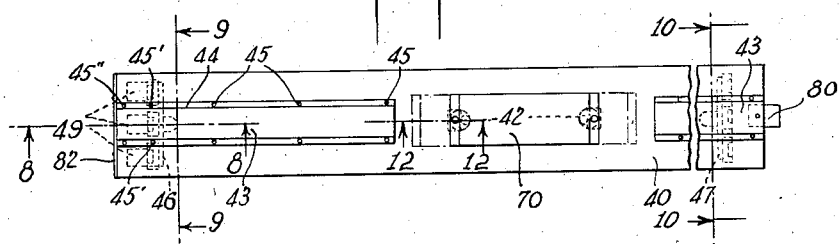
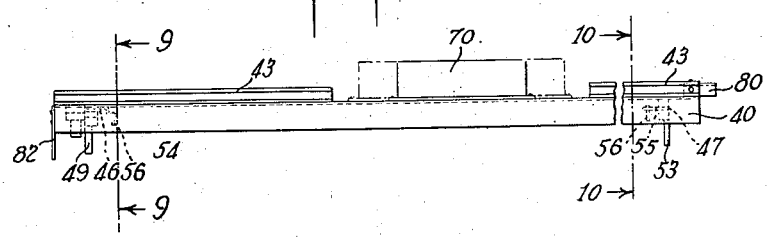
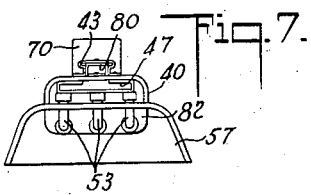
INVENTOR
SHIRLEY R. NAYSMITH
BY
ATTORNEY

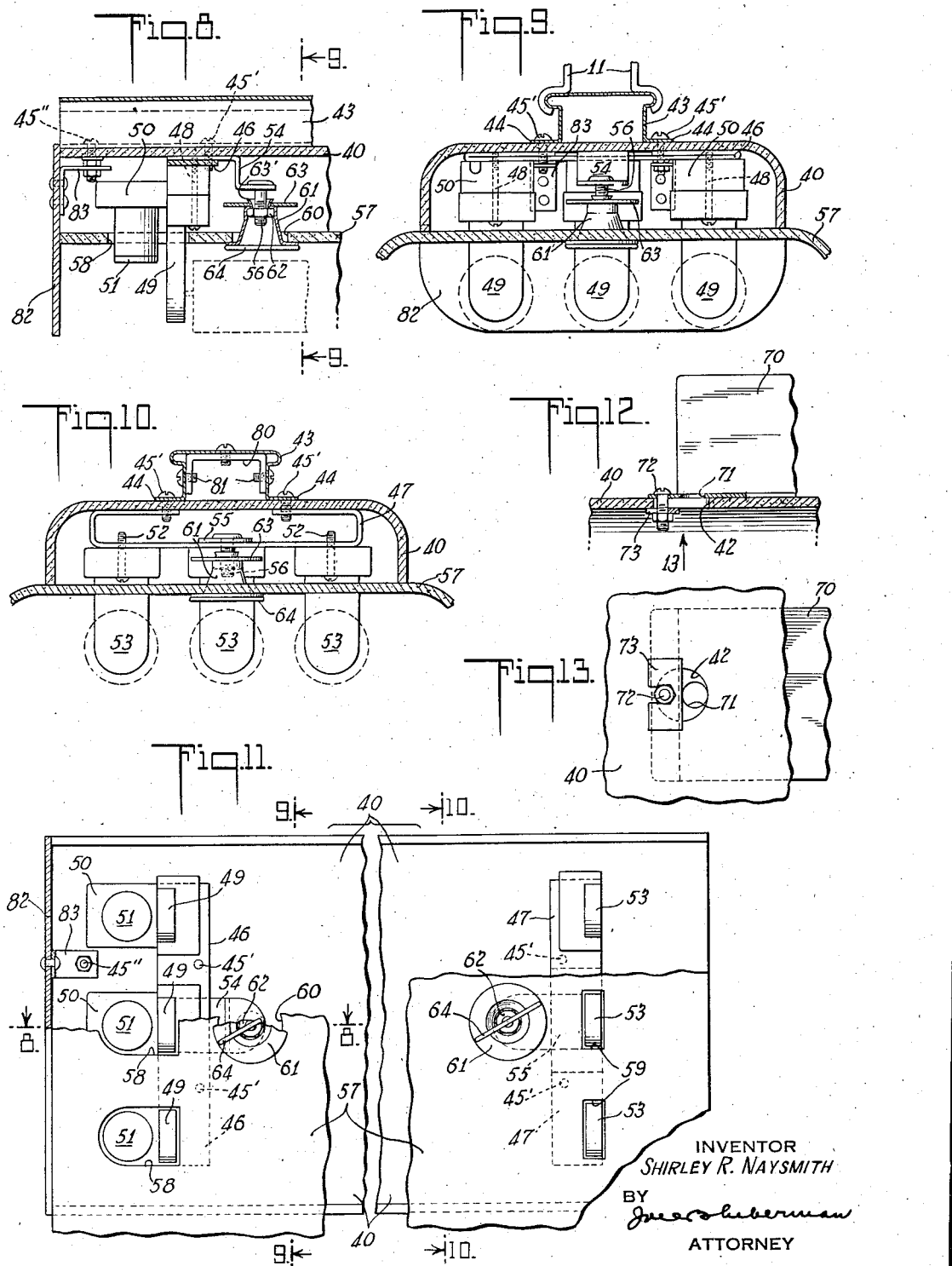

Patented Feb. 19, 1946

2,395,008

UNITED STATES PATENT OFFICE 2,395,008

FLUORESCENT LIGHTING EQUIPMENT

Shirley R. Naysmith, Meriden, Conn., assignor to The Miller Company, Meriden, Conn., a corporation of Connecticut Application March 16, 1943, Serial No. 479,327

7 Claims. (Cl. 240—78)

The present invention relates to fluorescent lighting equipment, and is more particularly directed toward continuous lighting equipment for fluorescent lamps and wherein only a small amount of metal is used in the structural parts.

Lighting equipment such as shown in my Patents 2,291,491 and 2,291,492 employs continuous sheet steel wireways of sufficient size to house the ballast, sockets and wiring and of sufficient rigidity to provide means for supporting these parts and also for supporting the lighting equipment from various forms of suspension. To conserve metal the use of non-metallic materials for the wireway, as well as the reflectors, has been suggested, but these have disadvantages of low structural strength, brittleness, warping, irregularity of size and dimension and difficulty of working which make it impossible to merely substitute one material for the other.

The present invention contemplates the use of units or sections, each including non-metallic wiring channel members and reflectors made in lengths corresponding with one or two fluorescent lamps arranged end to end, and hanger rails. The hanger rails may be of the same length as the unit or section, or short lengths of hanger rail may be used on each unit. In either case these hanger rails provide means for supporting all the parts whereby the entire equipment can be hung from various forms of overhead suspension, and the entire or dominant part of the load is taken by metal parts rather than by the non-metallic channel members. For continuous equipment the rails are coupled together.

In the preferred embodiment the invention contemplates the employment of sheet metal hanger rails to economize on steel and the exposing of the lamp ballast by mounting it on top of the wiring channel members where the heat which it gives off is readily dissipated to avoid excessive temperatures in the ballast or wiring channel.

Other and further objects will hereinafter appear as the description proceeds.

The accompanying drawings show, for purposes of illustrating the present invention, several embodiments in which the invention may take form, it being understood that the drawings are illustrative of the invention rather than limiting the same.

In these drawings:

Figure 1 is a vertical cross sectional view taken on the line 1—1 of Figure 2 and showing a form of lighting equipment using an I-beam hanger rail and having the ballast enclosed in the wiring channel member;

Figure 2 is a central longitudinal section taken on the line 2—2 of Figure 1 with parts in elevation;

Figure 3 is a fragmentary view similar to Figure 2 showing a modified form of construction for supporting the ballast;

Figure 4 is an inverted view of a wiring channel unit designed to accommodate three pairs of lamp sockets side by side and carrying an exposed ballast;

Figure 5 is a top plan view of the wiring channel member of Figure 4 showing the hanger rails, the ballast and the sockets;

Figure 6 is a side elevational view of the construction of Figure 5;

Figure 7 is an end elevational view of the construction of Figure 5 showing also the reflector;

Figure 8 is a fragmentary enlarged longitudinal sectional view taken on the line 8—8 of Figures 5 and 11 and showing the reflector in position;

Figure 9 is a transverse sectional view on the line 9—9 of Figures 5, 6 and 11 and showing the structural and electrical parts at one end of the fixture;

Figure 10 is a transverse sectional view on the line 10—10 of Figures 5, 6 and 11 showing the corresponding parts at the other end of the fixture;

Figure 11 is an inverted plan view with parts broken away to show interior construction;

Figure 12 is a fragmentary sectional view on the line 12—12 of Figure 5; and

Figure 13 is a fragmentary plan view taken in the direction of the arrow 13 of Figure 12.

In Figures 1 and 2 the hanger rail to which all parts of the lighting equipment are directly or indirectly secured is in the form of a straight I-beam 10. This I-beam can be conveniently supported by some form of clamp hanger such as illustrated at 11. While the upper part of the clamp hanger is here shown for pendent or rod mounting the upper part of the clamp hanger may be varied for other forms of support such as a conduit, messenger cable, or the like, the same forming, however, no part of the present invention.

As shown in the drawings the hanger rail 10 is drilled and tapped at 12 and 13 for screws 14, 14 designed to secure socket supports 15 in place at proper lamp length intervals, for example, 36", 48", or 60". At suitable intervals generally halfway between the pairs of holes 12 and 13 employed for a lamp length of hanger rail, the rail is drilled and tapped as indicated at 17—17 for screws 18—18 to support a lamp ballast 19.

The screws 14 and 18 pass through oversize holes 14' and 18' in the top wall 20 of an inverted channel shaped member 21, so that this channel shaped member may be secured to the hanger rail. The weight of the channel member is entirely taken up by the screws used in securing the socket supports and ballast to the hanger rail. The channel shaped members 21 as well as the hanger rails will usually be in lengths equal to the nominal length of a lamp, or of two lamps, and when secured in place will abut at the ends as indicated at the left of Figure 2. The rails are fastened together by plates 10a. These wireway forming channel members are made of non-metallic material suitable for withstanding the heat of the ballast and form a continuous wireway.

The socket supports 15, as shown in Figures 1 and 2 of the drawings, include an upper bent strap element 15a welded to a horizontal cross plate 15b. This plate directly supports the sockets 23, 23 for fluorescent lamps 24, 24 and starters, one of which appears at 25, the usual securing bolts 26 being employed.

The bottom of the wiring channel 21 is closed off by a reflector 27 held in place by bolts indicated at 28. The reflector is also made of non-metallic material capable of withstanding the heat from the lamps and provided with a suitable reflecting surface. It is provided with suitable apertures 29 for the lamp sockets 23, 23. The reflectors will also usually be made the same length as the wireway channels and the ends of the reflectors will abut, as indicated at the left of Figure 2.

In the form shown in Figure 3 the hanger rail 10' may be the same as the hanger rail 10, except that it is offset as indicated in this figure such that the upper part of the ballast 19 may project above the wireway forming channel member 21'. This channel member is similar to the one above described. It is here shown as being supported by an additional screw 31. The supports for the sockets and for the reflectors may be the same as before. In this form of construction a portion of the ballast 19 is exposed so that there is a greater opportunity for the heat generated in it to be dissipated.

Figures 4 to 13, inclusive, show a form of fixture employing a wide, comparatively shallow, wiring channel 40. This wiring channel is made of non-metallic material and is provided with parallel rows of holes 41a, 41b, 41c, 41d, 41e which extend from the ends nearly to the center line CL. It is also provided with two large holes 42, 42 spaced equidistant from the center line of the wiring channel.

Here the hanger rail means is in the form of two lengths 43, 43 of sheet metal rolled to a cross section such as illustrated in Figures 9 and 10. This hanger rail has flanges 44, 44 which are provided with holes to line up with the holes 41a to 41e, inclusive. Bolts 45 are passed through the holes 41c, 41d and 41e in the hanger rails to secure the hanger rail element and the wiring channel together. Screws 45' going through 41b, 41b are employed to support socket supporting straps 46 and 47.

The socket supporting strap 46 at the left end of the fixture, as shown in Figures 5, 6 and 11 of the drawings and in Figures 8 and 9, is a piece of strap metal bent double on itself, as indicated in the drawings, and lying close to the under surface of the wiring channel members 40. The strap 46 is tapped to receive screws 48 and these screws pass through the bases of fluorescent lamp sockets 49 and of fluorescent lamp starter sockets 50, whereby the lamp sockets 49 are spaced below the straps 46 and the starters 51 are carried beyond the lamp sockets. The strap 47 at the other end of the fixture is similar to the strap 46 but is not folded tight on itself. It is drilled and tapped to receive screws 52 and these screws are employed to support fluorescent lamp sockets 53 at the same elevation as the lamp sockets 49.

The supporting straps 46 and 47 carry brackets 54 and 55 extending toward one another and these brackets carry threaded studs 56. The reflector is shown at 57. It is made of suitable non-metallic material and it may have any desired shape. The reflector is provided at the left end with holes 58 to accommodate the lamp sockets 49 and starters 51, and is provided at the other end with holes 59 to accommodate the sockets 53.

Immediately underneath the studs 56, 56 the reflector is provided with large holes 60. A convenient means for securing the reflector to the reflector supporting studs is illustrated more in detail in Figures 8 and 11. A sheet metal stamping 61 is welded to a nut 62. The stamping is passed through the hole 60 in the reflector and a large washer 63 secured in place above the nut by flanging outwardly the upper part 63' of the stamping. This makes it impossible for these parts to be taken off the reflector. A rod 64 is welded across the bottom of the stamping. This rod forms a handle which one can grasp between the thumb and fingers and use to turn the stamping and nut so as to thread the nut on to the stud or remove it. As no tool is required there is no likelihood of tightening the reflector support too much.

The ballast 70 is secured on top of the wiring channel member, as shown in Figures 5, 6, 7, 12 and 13. The ballast may be a short one, as indicated in full lines, or a long one, as indicated in the dotted lines of Figures 5 and 6 depending on the type employed. These ballasts have wiring openings as indicated at 71 in Figures 12 and 13. The holes 42 in the channel are somewhat larger in diameter than necessary to accommodate the wires. The bolts 72 employed for securing the ballast to the wiring channel pass through the holes 42 and an elongated washer 73 spans each hole so that the ballast can be secured in position. The wires come down through the hole 42.

The wiring channel 40 is preferably made just deep enough to accommodate the bases of the socket equipment necessary for the lamps. The width of the wiring channel is such that three sockets can be accommodated side by side (or two, if desired), and wires can be passed both outside the sockets and between the sockets. To improve the clarity of the drawings the wires are omitted, the connections, of course, will be the usual connections for the number and size of lamps being employed. Where the units are made up in lengths to correspond to a single lamp the overall length of the wiring channel will be slightly greater than the standard lamp length, and where they are made up for two lamps end to end it will be twice as long. Reflector lengths usually are limited to the length of the shorter wiring channel.

Where the units are to be coupled together to form a continuous wiring equipment the hanger rails 43 are secured to inverted channel shaped connecting straps 80, as shown in Figures 6 and 10. These straps are secured to the hanger rails by screws, as indicated at 81.

Where a single unit is to be used for a fixture, or the unit forms the end of a long run of continuous equipment, the end is closed off by an end plate 82, as shown in Figures 6 and 8. This end plate is held in place by brackets 83 carried on the bolts 45" which pass through the end holes 41a of the wiring channel.

In this construction the lighting equipment can be supported from clamp type holders 11 or other forms of suspension as above discussed. The construction provides for the elimination of practically all of the metal parts and for the carrying of all of the load on these metal parts with minimum stresses in the non-metallic parts. Whatever stress there is in the wiring channel member is very well distributed by reason of the number of bolts employed in securing the wiring channel member to the hanger means.

The arrangements shown herein use the minimum amount of critical material and permit large economies in non-critical material such as conduit, outlet boxes, suspensions and the like.

Since it is obvious that the invention may be embodied in other forms and constructions within the scope of the claims, I wish it to be understood that the particular forms shown are but a few of these forms, and various modifications and changes being possible, I do not otherwise limit myself in any way with respect thereto.

What is claimed is:

1. Suspended continuous lighting equipment, comprising a plurality of inverted trough shaped reflectors disposed end to end to form a continuous reflecting trough and made of non-metallic material characterized by low structural strength, brittleness, and warping, a plurality of inverted trough shaped wiring channel members of similar material narrower than the tops of the reflectors and disposed end to end immediately above the reflectors to form a continuous wiring channel, lamp socket supports housed within the wiring channel at intervals corresponding to lamp length, a plurality of fluorescent lamp sockets carried by each socket support side by side and spaced apart to provide wiring space between them, hanger rail means immediately above the wiring channel and extending longitudinally of the same, bolt-like devices passing through the socket supports and openings in the top of the wiring channel and secured to the hanger rail means whereby the wiring channel is supported from the hanger rail means by the socket supports, socket-support-carried reflector-supporting means including threaded members accessible below the reflectors for clamping the reflectors against the wiring channel members, whereby the bottom of the wiring channel is closed, the reflectors being apertured to accommodate the lamp sockets, and fluorescent lamps carried by the sockets.

2. Lighting equipment such as claimed in claim 1, wherein the hanger rail means includes an I beam with the web vertical, and the bolt-like devices are screws threaded into tapped holes in the bottom of the I beam.

3. Lighting equipment such as claimed in claim 1, wherein the hanger rail means for each wiring channel member includes two inverted sheet metal channel members each provided with longitudinal ribs along the top thereof, each sheet metal channel member being secured to the wiring channel near an end of the wiring channel, and having a fluorescent lamp ballast secured on top of each wiring channel member between the sheet metal channel members.

4. Lighting equipment such as claimed in claim 1, wherein the bolt-like devices pass through openings in the tops of the channel members which are oversize to provide clearance whereby distortion or irregularity in size of the channel members does not affect the positioning of the sockets.

5. Suspended continuous lighting equipment comprising a plurality of inverted trough shaped reflectors disposed end to end to form a continuous reflecting trough and made of non-metallic material characterized by low structural strength, brittleness and warping, a plurality of inverted trough shaped, non-metallic wiring channel members disposed end to end immediately above the reflector to form a continuous wiring channel and having a wide top of a width to accommodate a plurality of fluorescent lamp sockets side by side with wiring space between the same, inverted sheet metal channel members having longitudinally extending ribs along the top thereof and bottom flanges, lamp socket supports housed within each channel member at intervals corresponding to lamp length, bolt-like devices passing through openings in the top of the corresponding wiring channel member and the bottom flanges of the sheet metal channel members whereby said wiring channel members are supported from the sheet metal channel members, means carried by the socket supports for each wiring channel member for securing a reflector across the bottom of that channel member so that the load of the reflector, the sockets and the wiring channel members is taken by the bolt-like devices, fluorescent lamp sockets carried by the socket supports and passing through apertures in the reflectors, fluorescent lamps carried by the sockets, and couplings for securing the sheet metal channel members together end to end to hold the troughs and reflectors together end to end.

6. A fluorescent lighting unit for continuous lighting equipment comprising an inverted U-shaped wiring channel of non-metallic material and characterized by low structural strength, brittleness and warping and having a wide top of a width to accommodate a plurality of fluorescent lamp sockets side by side with wiring space between the same, two enclosed socket supporting straps disposed transversely of the top of the wiring channel, one at each end of the channel, a longitudinally extending metallic supporting means above the wiring channel; bolt-like devices extending through the wiring channel and securing the strap and channel to the supporting means, a bracket arm carried by each strap and having a downwardly extending threaded stud, lamp sockets carried by the straps and extending down below the wiring channel, a non-metallic reflector through which the sockets extend, and stud carried reflector supporting means.

7. Lighting equipment such as claimed in claim 6, having a fluorescent lamp starter socket secured between one strap and the sockets carried thereby, the other strap being lower than the first in an amount to locate the sockets carried by it at the same level as the other sockets.

SHIRLEY R. NAYSMITH.